(12) United States Patent
Lee (10) Patent No.: US 6,985,959 B1
(45) Date of Patent: Jan. 10, 2006

(54) CONSTRAINT ROUTE DISSEMINATION USING DISTRIBUTED ROUTE EXCHANGES

(75) Inventor: Cheng Y. Lee, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 849 days.

(21) Appl. No.: 09/704,291

(22) Filed: Nov. 1, 2000

(51) Int. Cl.
  *G06F 15/173* (2006.01)
(52) U.S. Cl. ............... 709/238; 709/223; 709/230; 709/203
(58) Field of Classification Search ............... 709/238, 709/227, 237, 203, 223; 370/396, 351, 392
  See application file for complete search history.

(56) References Cited

U.S. PATENT DOCUMENTS

| | | | | |
|---|---|---|---|---|
| 5,825,772 A | * | 10/1998 | Dobbins et al. | ............. 370/396 |
| 5,881,246 A | * | 3/1999 | Crawley et al. | ............. 709/238 |
| 5,920,699 A | * | 7/1999 | Bare | ............. 709/225 |
| 5,995,503 A | * | 11/1999 | Crawley et al. | ............. 370/351 |
| 6,049,524 A | * | 4/2000 | Fukushima et al. | .......... 370/220 |
| 6,205,488 B1 | * | 3/2001 | Casey et al. | ............. 709/238 |
| 6,339,595 B1 | * | 1/2002 | Rekhter et al. | ............. 370/392 |
| 6,418,476 B1 | * | 7/2002 | Luciani | ............. 709/238 |
| 6,473,421 B1 | * | 10/2002 | Tappan | ............. 370/351 |
| 6,757,258 B1 | * | 6/2004 | Pillay-Esnault | ............. 370/254 |
| 2002/0052915 A1 | * | 5/2002 | Amin-Salehi | ............. 709/203 |

OTHER PUBLICATIONS

B. Fox et al., RFC 2685: Virtual Private Networks Identifier, Network Working Group, Sep. 1999, 6 pages, http://www.i-etf.org/rfc/rfc2685.txt.*

* cited by examiner

*Primary Examiner*—Bharat Barot
*Assistant Examiner*—B R Bruckart
(74) *Attorney, Agent, or Firm*—Max R. Wood; Ogilvy Renault LLP (57) ABSTRACT

Distributed traffic engineering route exchanger routers (TE-Xs) are used in an open shortest path first (OSPF) routing area to collect Traffic Engineering Link State Advertisements (TE-LSAs) and exchange the TE-LSAs with other TE-Xs. TE-Xs store TE-LSAs and compute explicit routes required by edge routers. A single point of failure that exists when a single centralized TE database is used is thereby eliminated. The TE-Xs peer with other TE-Xs in a routing area and exchange TE-LSAs to keep traffic engineering link state databases (TE-LSDBs) synchronized. Network resources are preserved for payload traffic and resource reservation collisions are reduced.

44 Claims, 4 Drawing Sheets

CONSTRAINT ROUTE DISSEMINATION USING DISTRIBUTED ROUTE EXCHANGES

CROSS-REFERENCE TO RELATED APPLICATIONS

This is the first application filed for the present invention.

MICROFICHE APPENDIX

Not Applicable.

TECHNICAL FIELD

The present invention relates in general to routing control in data networks, and in particular to constraint route dissemination in a data network that uses an Open Shortest Path First (OSPF) routing protocol.

BACKGROUND OF THE INVENTION

Open Shortest Path First (OSPF) is a routing protocol developed for Internet Protocol (IP) networks based on the shortest path first or link-state algorithm.

Routers use link-state algorithms to send routing information to all nodes in an IP network by calculating the shortest path to each node based on a topography of the IP network constructed by each node. Each router maintains a routing table in which the router stores routes to particular network destinations. Each router sends the state of its own links to other routers in the IP network.

The advantage of shortest path first algorithms, compared to distance vector algorithms, is that they result in smaller more frequent updates everywhere in the IP network. They also converge quickly, so that problems such as routing loops and infinite counts, in which routers continuously increment the hop count to a particular destination node, are avoided.

A disadvantage of OSPF algorithms is that they require a great deal of processing power and memory in the OSPF routers. However, it is generally believed that the advantages outweigh the disadvantages, and OSPF Version 2, which is defined by RFC 1583, appears to be rapidly replacing Reservation Initiation Protocol (RIP) on IP networks.

Current OSPF link-state routing protocols flood Link-State Advertisements (LSAs) to all OSPF routers. This provides OSPF routers with routing information for routing payload packets on a hop-by-hop basis. However, for the purposes of establishing paths for Traffic Engineering (TE), TE routing information is only required at a point where the path setup is triggered. Consequently, it is not necessary for all routers in a routing area to flood, process and store a large number of TE-LSAs.

If each OSPF router in an IP network of a number (n) of OSPF routers originates a number (L) of LSAs and floods the LSAs on a number (p) of ports, each router in the network potentially receives up to n*L*p LSAs. The total number of LSAs processed by all OSPF routers in the network is therefore potentially n*n*L*p LSAs. This places an unnecessarily large computation load on the OSPF routers, and forces the provision of high speed processors and a large amount of memory in the routers. It also appropriates network bandwidth for LSA exchange that could be more profitably used for payload packet traffic.

Figure 1:
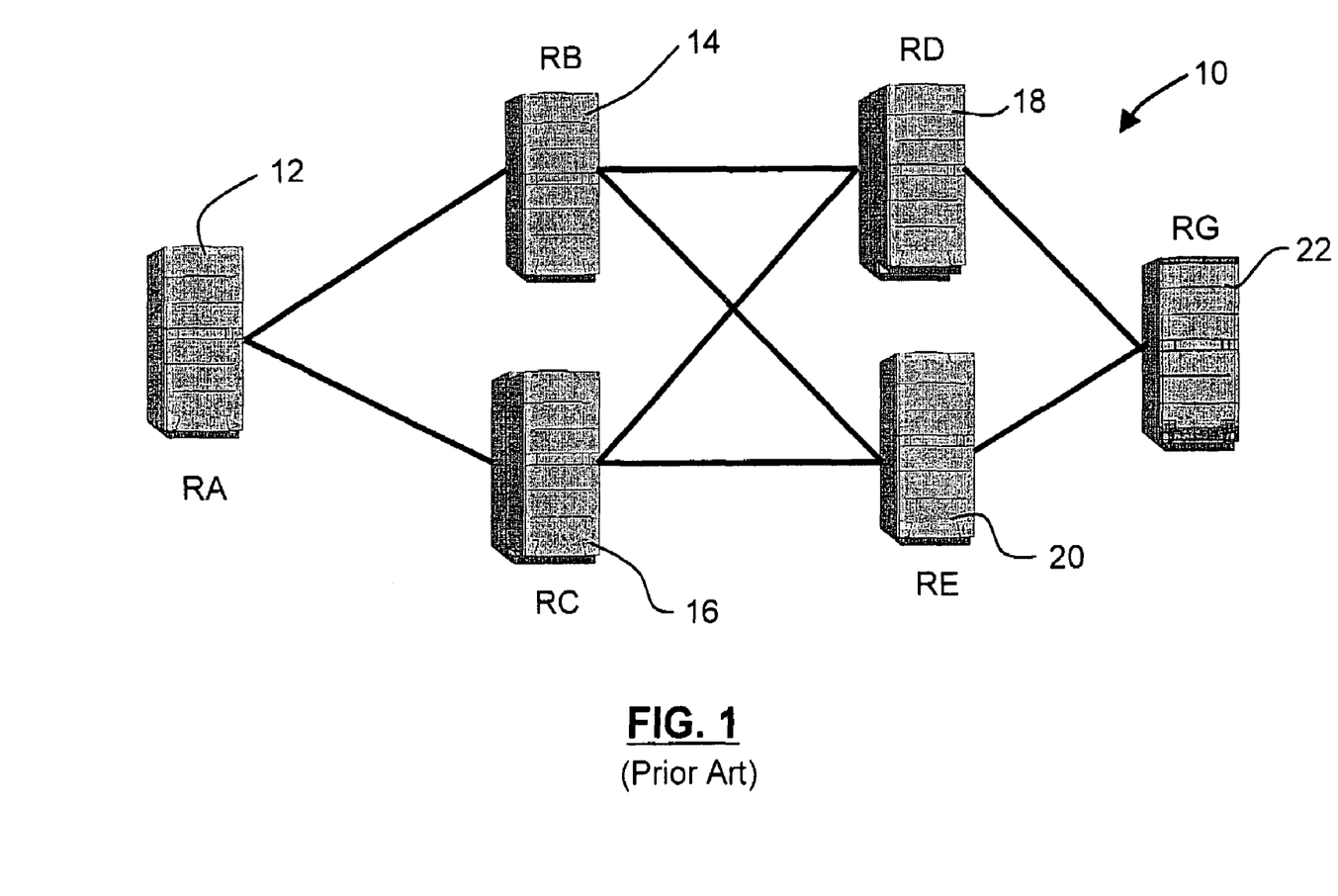
FIG. 1 is a schematic diagram of an OSPF network in accordance with the prior art.

FIG. 1 is a schematic diagram of an Internet Protocol (IP) network 10 that uses an Open Shortest Path First (OSPF) routing protocol in accordance with the prior art. The network also includes a plurality of routers 12–22, labeled as routers A–G. The structure and functions of the network 10 are well known in the art.

SUMMARY OF THE INVENTION

The invention provides a method and apparatus for establishing explicit edge-to-edge paths in an Internet Protocol (IP), Multi-Protocol Label Switched (MPLS) or Optical network that uses an open shortest path first (OSPF), or similar routing protocol, for computing explicit constrained paths.

The invention adds a new type of router to the network. The router is a traffic engineering route exchange router (TE-X) that maintains a traffic engineering link-state database (TE-LSDB) using link state information sent by associated OSPF routers in traffic engineering link state advertisement (TE-LSA) messages. The association between a TE-X and other OSPF routers is preferably based on proximity (least cost). The OSPF router only sends TE-LSAs to its associated TE-X via a fast path. The TE-LSAs are not flooded to all routers in the network.

In accordance with the method, traffic engineering link state advertisement (TE-LSA) messages are sent from OSPF routers in the network to a nearest traffic engineering route exchange router (TE-X) in the network, to permit the TE-Xs in the network to maintain traffic engineering link-state databases (TE-LSDB). The nearest TE-X is queried to obtain an explicit edge-to-edge path satisfying specified traffic engineering (TE) parameters supplied by the querying OSPF router.

It should be understood that the concept of the TE-X and the mechanisms for discovering and distributing routes in accordance with the invention are applicable to other routing protocols besides OSPF. For example, Intermediate System to Intermediate System Intra-Domain Routing Exchange Protocol for use in Conjunction with the Protocol for Providing the Connectionless-Mode Network Service (ISO 8473), International Standard ISO 10589, 1992.

The invention therefore provides an improved data network in which traffic engineering message volume is reduced and the computing power and memory required for most routers in the network is dramatically reduced. Network resources are therefore conserved and network provisioning is simplified.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 2:
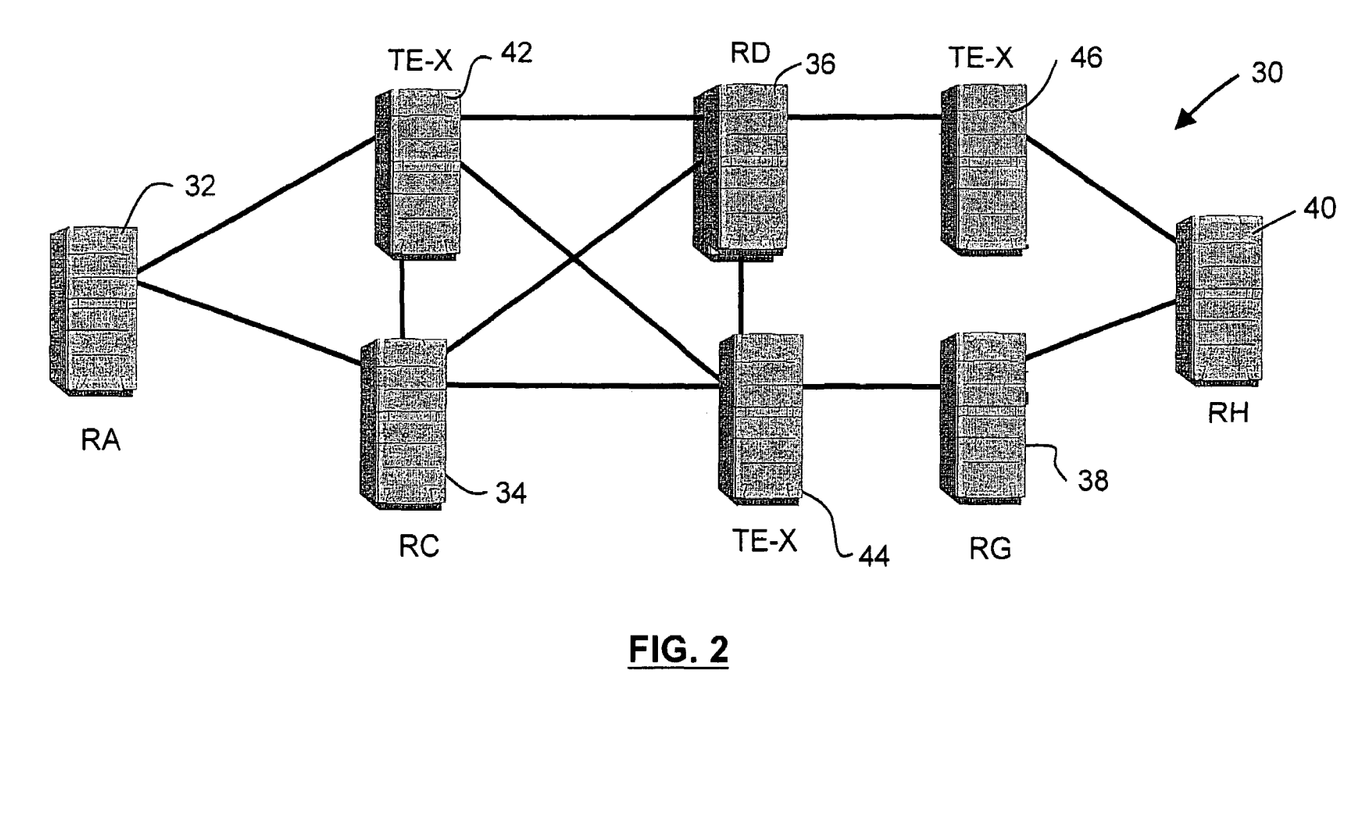
FIG. 2 is a schematic diagram of an OSPF network in accordance with the invention.

FIG. 2 is a schematic diagram of an Internet Protocol (IP) network 30 in accordance with the invention that uses the OSPF routing protocol. The network 30 includes a plurality of interconnected to routers 32–40 and three traffic engineering route exchange routers (TE-X) 42–46, for the sake of example. As will be explained below in more detail, the TE-Xs 42–46 receive Traffic Engineering Link-State Advertisement messages (TE-LSAs) from the routers 32–40 and use the LSAs to construct a traffic-engineering database (TE-database) 48–52. The TE-databases 48–52 are used to store explicit routes between edge routers (32 and 40, for example) in the IP network 30.

Figure 3:
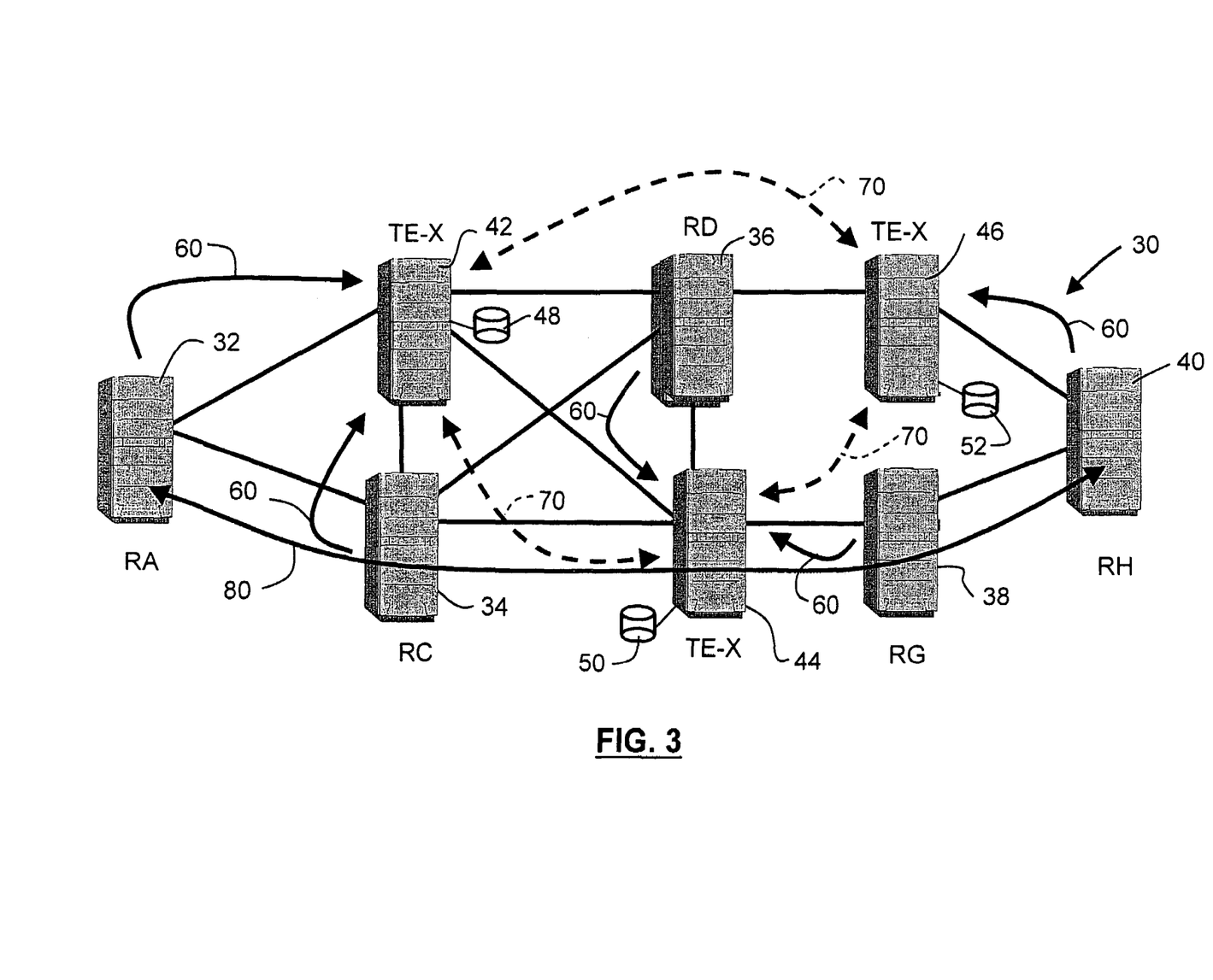
FIG. 3 is a schematic diagram of the OSPF network shown in FIG. 2, illustrating traffic engineering message exchange between the OSPF routers in the network and traffic engineering route exchange routers in accordance with the invention.

FIG. 3 schematically illustrates the TE-LSA message exchanges in the IP network 30 in accordance with the invention. TE-LSAs sent from the OSPF routers 32–42 are shown as solid lines 60, whereas TE-LSAs sent from TE-Xs to other TE-Xs to synchronize the TE-databases 48–52 are shown as dashed lines 70. As will be explained below in more detail, TE-LSAs are sent directly from OSPF routers on a fast path to a closest TE-X 42–46. Each OSPF router 32–40 in the network 30 originates a number (L) of TE-LSAs and sends the L TE-LSAs directly to a TE-X 42–46, only the TE-Xs 42–46 collectively receive the n*L LSAs, where n is the number of OSPF routers in the network 30. Note that the L TE-LSAs are not flooded on all ports of the respective routers 32–42. The total number of TE-LSAs processed in the network 30 is therefore x*n*L, where x is the number of TE-Xs 42–46 in the network 30. The invention therefore reduces the total number of TE link states flooded, processed and stored in a network. In other words, the invention reduces the total amount of network and router resources required for processing TE-LSAs, from $O(n^2)$ to $O(n)$, in a network 30 of n nodes.

To setup a constraint path in the network 30, an edge router (32, for example) queries the nearest TE-X (42 in this example) for a route satisfying specified constraints. The TE-X 42 returns an explicit set of routes (an Explicit Route Object (ERO), as specified by the Multi-Protocol Label Switched Path (MPLS) protocol). The exact semantics of the query and response message are not a part of this invention.

An edge router discovers TE-Xs in the network 30 via normal Router LSAs, as will be explained below in more detail. TE-Xs in a routing area elect a Designated TE-X and peers with it. Each Area Border Router (ABR), which must also be a TE-X, peers with other TE-Xs in other areas, in the same way. The routers in the network are assumed to be connected (e.g. via a control channel) and can be reached via shortest path routes computed using normal LSAs flooded by OSPF.

As explained above, the TE-LSAs are not flooded like normal LSAs used to calculate the "shortest path". Consequently, a router 32–40 in the network 30 only sends out one copy of its TE-LSAs and the TE-LSAs are forwarded directly (on a fast path) to the nearest TE-X, without incurring processing delay (in addition to slow path delay) on every hop, which occurs when normal LSAs are flooded. Similarly, a TE-X sends TE-LSAs directly to other TE-Xs via the mechanism of peering with other TE-Xs. As a result, the time required for TE link states to converge within the routing domain is reduced, and routers not involved in initiating the establishment of constraint paths are not burdened with processing and storing (TE/constraint) link states (in addition to normal link states) that they do not need. Only "edge" routers need to have access to the explicit constraint routes.

It should be noted that only routers (OSPF-TE) that support constraint path setup need to be provisioned with the functionality of a TE-X 42–46 in accordance with the invention. It is possible to upgrade existing OSPF label switching routers (LSRs) with OSPF-TE support since there is very little processing and storage impact on the LSRs (see "draft-ietf-mpls-arch-07"). The heavier processing and storage requirement is at the TE-X, which must process and store a large number of TE-LSAs and compute TE routes.

In accordance with the invention, the TE-LSAs are sent directly to the "nearest" TE-X. TE-Xs are discovered through normal Router Link State Advertisement (LSA). A TE-X exchanges TE-LSAs with other peer TE-Xs. Edge routers query a TE-X for a constraint or TE route to a destination.

To be able to discover TE resources (e.g., links, bandwidth) to another router C (router 34 in FIG. 3), a router A (router 32 in FIG. 3) must already have connectivity to router C, either via an existing link or a control channel setup for control messages (for e.g. MPLS signaling, or OSPF control messages) between C and A.

If C is reachable (but not directly), it is also possible for A to learn (through the TE-X) about links that could potentially be used to reach C directly. It is likewise possible for A to advertise (again via a TE-X) the potential links that connect it directly, or in 'one hop', to other networks that may include another router, and vice-versa. This is useful in applications like virtual private network (VPN), where a router may have connectivity to another router, but not a direct link, and may setup "on-demand" circuits to the other router.

Currently, this is not feasible (every TE link must have a corresponding control channel) because OSPF routers have to flood and exchange TE-LSAs with their neighbors. As explained above, in accordance with the invention OSPF routers send TE-LSAs to a nearest TE-X only. Hence, it is not mandatory to have a control channel for every set of TE links to enable TE routing information to be disseminated.

Changes to OSPF Routers Originating TE-LSAs

In accordance with the invention, OSPF routers are routers 34–38 that are not TE-X 42–46 routers. OSPF routers that support TE-LSA distribution are referred to as OSPF-TE routers. The normal Link-State Database is referred to as a LSDB and the Engineering Link-State Database 48–52 (FIG. 3) are referred to as TE-LSDBs.

OSPF routers that originate TE-LSAs send Link-State Update (LSU) messages directly via unicast to the nearest TE-X instead of flooding them from each of their interfaces. TE-LSAs are only received by TE-Xs. OSPF-TE routers do not receive TE-LSAs originated by other OSPF routers, nor do they send TE-LSAs to other OSPF routers (unless they are TE-Xs) or exchange TE-LSAs with other OSPF routers.

The behavior of OSPF routers with respect to normal LSAs is not changed, with the exception of the processing of Router-LSAs. When a new or newer Router-LSA instance is received (as described in [OSPF]), and the Option Field of the outer-LSA indicates that it is a TE-X, as will be explained below, the OSPF-TE router uses the instance to maintain a list of TE-Xs in the routing area. It also uses the Router-LSA instance to compute an entry in a normal OSPF routing table for the Advertising Router, which is the Router ID for a Router-LSA. The entry in the OSPF routing table is similar to an Autonomous System Border Router (ASBR) route entry. The entry in the routing table is in addition to the normal installation procedure of the Router-LSA in the normal LSDB, which is well known in the art. If the Option Field does not have the TE-X indication set, the Router-LSA is processed and installed as described in RFC2328. The Router ID of a TE-X should be a unique IP address identifying the TE-X router in an Autonomous System, and is preferably not an interface address, but rather an address not assigned to any other interface. It may, however, be an address assigned to a "loopback" or dummy interface.

When an OSPF router is initialized, it establishes adjacencies with its neighbor(s). Once the adjacencies are established (Section 7 of OSPF), an OSPF-TE router determines the nearest TE-Xs from the normal routing table it has computed (See Section "Computing TE-X Routing Entry" below) for the Link-State Database (LSDB). The OSPF-TE goes through its list of TE-Xs, and preferably caches up to two TE-Xs (the primary TE-X and a backup TE-X), as described below in the Section "Determining Nearest TE-Xs". TE-X capability is advertised in Router-LSA instances, as described below in the Section "Advertising TE-Xs".

Originating TE-LSAs

Prior to sending a TE-LSA, the OSPF-TE router should send a TE Database summary list and wait for acknowledgement from the TE-X. The details of this procedure are described below in the section "Sending Link State Update TE-LSAs".

The OSPF-TE router then proceeds to originate TE-LSAs describing its connectivity or links and the constraints associated with the connectivity, and sends these TE-LSAs to the nearest TE-X. The TE-LSAs are defined in [OSPF-TE-EXT], and have the following format:

There are 2 types currently defined:

1) Router Type, Length, Value (TLV)—describes the address of the router that is always reachable;
2) Link TLV—describes a single link.

The following sub-TLVs of the Link TLV—Link type, Link ID, local/remote interface IP address describes the link and the maximum bandwidth, maximum reservable bandwidth, resource class, describes the constraints of that link. Additional sub-TLVs are defined in *ompls* and these TE-LSAs can be distributed using the mechanisms in accordance with the invention.

If the TE-X does not acknowledge a TE-LSA sent, the OSPF-TE router must attempt to retransmit the TE-LSA to the backup TE-X.

VPN Sub-TLV

The purpose of the VPN sub-TLV is to indicate to other nodes in the network the VPN Identifier (VPN ID) [RFC2685], that is associated with a router.

The format of the VPN sub-TLV is as shown below in Table 1:

TABLE 1

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|              18               |             Length            |
+-+-+-+-+-+-+-+-+-+-+-+-+-+-+-+-+-+-+-+-+-+-+-+-+-+-+-+-+-+-+-+-+
|                      No. VPN Attachments                    |T|
+-+-+-+-+-+-+-+-+-+-+-+-+-+-+-+-+-+-+-+-+-+-+-+-+-+-+-+-+-+-+-+-+
|   Reserved        |                                           |
+-+-+-+-+-+-+-+-+-+-+-+                VPN ID                   +
|                                                               |
+-+-+-+-+-+-+-+-+-+-+-+-+-+-+-+-+-+-+-+-+-+-+-+-+-+-+-+-+-+-+-+-+
```

The VPN sub-TLV is optional. The VPN ID is as defined in [RFC 2685], is 7 octets in length. The "T" field indicates whether a router is connected to a transit VPN node. A transit VPN node permits other VPN nodes to connect to it to reach other VPN nodes. The "No. VPN Attachments" (number of VPN attachment allowed) indicates the maximum number of VPN nodes that can be connected to a transit VPN node, in order to reach other VPN nodes having the same VPN ID.

Replicating or Multicast Capable Sub-TLV

The purpose of the Replicating capable sub-TLV is to indicate to other nodes that a router is capable of replicating data to more than one end point.

The format of the Replicating Capable sub-TLV is shown below in Table 2:

TABLE 2

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|              19               |            Length             |
+-+-+-+-+-+-+-+-+-+-+-+-+-+-+-+-+-+-+-+-+-+-+-+-+-+-+-+-+-+-+-+-+
|                         No. of Receivers                      |
+-+-+-+-+-+-+-+-+-+-+-+-+-+-+-+-+-+-+-+-+-+-+-+-+-+-+-+-+-+-+-+-+
```

The "No. of Receivers" field indicates the number of receivers permitted to be attached to a Replicating Capable router.

Discovering TE-Xs

OSPF-TE routers discover TE-Xs via normal Router-LSA flooding, as described below with reference to "Advertising the TE-X". When an OSPF-TE router receives a Router-LSA with the TE-X indication bit on, it stores an IP address of the TE-X in a TE-X data structure. In addition, once a Dijkstra computation of routes to all destinations in the network is performed, the OSPF-TE also stores a cost of a shortest path route to each TE-X in a designated area of the TE-X data structure.

Determining Nearest TE-Xs

The "nearest" TE-X to an OSPF-TE is the TE-X with a least total link cost from the OSPF-TE, which is computed as described above. If an OSPF-TE router is a TE-X, then the nearest TE-X is the router itself. Once an OSPF-TE has received the routing information in the domain, it goes through its list of TE exchanges, starting from the nearest TE-X, to find out which of the TE-Xs will agree to serve the OSPF-TE. The route to a TE-X is determined from the routing table calculation described in Section 16.1 of [OSPF]. In accordance with the invention, the OSPF-TE sends a probe message to each of the TE-Xs in the list, until two TE-Xs agree to serve the OSPF-TE by acknowledging the probe message. The nearest (least cost) TE-X acknowledging the probe message is designated as the primary TE-X, and the next nearest TE-X acknowledging the probe is designated as the backup TE-X. If two TE-Xs have the same route cost, the one with the smallest difference in address value compared to the Router ID of the OSPF-TE, is chosen as the primary TE-X and the other as the backup TE-X.

If only one TE-X responds to the probe messages, then the OSPF-TE is served by only one TE-X, and the OSPF-TE preferably generates an alert message to a network router management system. In an operational network, it should normally be sufficient to have three distributed TE-Xs. Consequently, if one TE-X fails, a primary and secondary TE-X are always available to serve all the OSPF-TES, assuming the network is not partitioned.

Sending Link State Update TE-LSAs

OSPF routers send TE-LSAs directly to the nearest TE-X. If an OSPF router does not receive a Link State Acknowledge for a TE-LSA sent to a particular TE-X after a timeout period, it sends the TE-LSA to a next nearest TE-X and re-invokes the "Determining nearest TE-X" mechanism to discover current serving TE-Xs.

Initially, a Database Summary List is sent to the TE-X, and the sending OSPF-TE expects to receive Link State Requests related to the TE-LSAs that the TE-X wants to update in its database. The OSPF-TE sends the TE-LSAs to the TE-X as requested in a Link State Request message. The difference between this procedure and OSPF database synchronization is that the OSPF-TE does not request TE-LSA from the TE-X.

An OSPF router does not initiate adjacency establishment nor maintain adjacency or exchange hellos with a TE-X. An OSPF router is able to discover the serving TE-X via Router-LSAs, as explained above with reference to "Determining Nearest TE-Xs".

TE Exchange

TE-Xs must participate in normal OSPF route distribution, although they may not necessarily be participating in path setup or be able to "label switch", for instance a TE-X may be a leaf of the IP network 30, setup to function solely as a traffic engineering route exchange router (TE-X).

Advertising the TE-X

A TE-X must advertise its capability. Advertising of the TE-X is preferably accomplished using the Router LSA "Options" field as shown below. A TE-bit in the Options field is defined for this purpose. It should be noted that a TE-X also indicates whether it is an area border router, or an AS boundary router, by setting the appropriate bits (bit B and bit E, respectively) in its router-LSAs.]

Options Field in LSA Header is shown in Table 3:

TABLE 3

The Options Field

| TE | O | DC | EA | N/P | MC | E | * |

*Reserved bit

As seen in Table 3, the options field contains 8 bits, 6 of which have to date been reserved for the purposes described below. In accordance with the invention, one of the two reserved bits is used as a TE-bit for advertising a TE-X. The bits in the Options field are respectively used as follows:

E-bit

Specifies the way AS-external-LSAs are flooded, as described in Sections 3.6, 9.5, 10.8 and 12.1.2 of [OSPF].

MC-bit

Specifies whether IP multicast datagrams are forwarded according to the specifications in [MOSPF].

N/P-bit

Specifies the handling of Type-7 LSAs, as specified in [NSSA].

DC-bit

Specifies the router's handling of demand circuits, as specified in [DEMD].

EA-bit

Specifies the router's willingness to receive and forward External-Attributes-LSAs, as specified in [EAL].

O-bit

Specifies the router's willingness to receive and forward Opaque-LSAs as specified in [rfc2370].

TE-bit

Specifies a Traffic Engineering Route Exchange Router in accordance with the invention for receiving and distributing constraint routes, as well as computing and providing constraint paths or explicit routes when queried.

TE Exchange Peering

When a TE-X is initialized, the TE-X behaves like a normal OSPF-TE, creating adjacencies with its neighbor(s) [designated routers (DRs) and backup designated routers (BDRs) on broadcast and NBMA networks) to exchange normal (non TE) routing information. Once a TE-X has established adjacencies and downloaded the domain link state database (as defined in the RFC2328), the TE-X begins to establish adjacencies or peering with other TE-Xs in the area, that it learned from normal (non-TE) Router-LSAs (and stored in the list of TE-Xs). The peering with other TE-Xs is established similarly to the creation of adjacencies with OSPF neighbors. The TE-X sends (unicast) to each other TE-X in the routing area Hello or Keep-Alive messages (to differentiate from OSPF Hello messages). Once the TE-X DR of the routing area is discovered via the Keep-Alive messages, the TE-X attempts to establish an adjacency with the TE-X DR to exchange TE routing information. Once bi-directional communication has been established with the TE-X DR (i.e. 2-Way Received neighbor state), the TE-X proceeds to exchange the TE-LSAs, in the same way as Database synchronization and Exchange of normal LSAs is accomplished, until the TE-X has obtained a full set of TE-LSAs for the routing domain.

A designated router TE-X, the TE-X DR, and the backup designated router TE-X, the TE-X BDR, in a routing area are preferably elected using the same procedures as are used to elect an OSPF DR and BDR. The TE-X DR is responsible for peering with other TE-Xs in a routing area. All TE-Xs maintain a consistent TE-LSDB of the routing area by synchronizing and exchanging TE-LSAs. It should also be noted that a TE-X does not peer with other (non TE-X) OSPF-TEs.

Updating Resources at OSPF-TEs and TE-Xs

Once an OSPF-TE router has setup a path (the router may be functioning as a Label Switched Router, LSR), it should update the designated TE-X of its currently available resources. To accomplish this, the OSPF-TE originates new TE-LSAs reflecting its available resources. On receipt of the new TE-LSAs, the TE-X distributes the new TE-LSAs to each of its peer TE-Xs.

There may be instances during setup of an explicit path (LSP1) in which a TE-X, using its existing TE-LSDB, computes a path that traverses links that do not have enough free resources, because a conflicting path is being established. If this happens, the path setup algorithm may choose to use crank-back, and attempt to obtain a diverse explicit route to the destination from the point where the path setup was cranked back. The router may obtain the diverse explicit route from the TE-X. The choice of heuristics in path setup is beyond the scope of this invention, however, an example of path setup is described to illustrate how routers may obtain an explicit route from a TE-X, under certain circumstances.

The necessity of having absolute up-to-date information should be carefully examined. Nevertheless, the timely distribution of available resources can be improved using the following mechanism. When an edge router 32 (FIG. 3) requests a 2.5 Gbs constraint shortest path to and another edge router 40, for example, the TE-X 42 may originate the delta of resources reserved (RR), RR TE-LSAs (in this case the bandwidth reserved along the C-SPF) and distributes the RR TE-LSAs to other peering TE-Xs 44 and 46 via messaging channels 70. This prevents the other TE-Xs 44,46 from assigning routes along the same path assigned by TE-X 42, if inadequate resources exist along a link in the path after the path is setup along the constrained shortest path first (C-SPF) route computed by TE-X 42. RR TE-LSAs reduce the occurrence of "resource allocation collision", by leveraging each TE-X's a priori knowledge of resources allocated, if the knowledge is rapidly distributed to other TE-Xs.

As described above, all TE-Xs must have consistent TE-LSDBs, but OSPF-TEs do not maintain TE-LSDBs. RR TE-LSAs are only originated by TE-Xs and reflect the delta of resources used. However, RR TE-LSAs do not change the TE topology database. When the connectivity associated with constraints or traffic engineering of an OSPF-TE router changes (e.g. due to, interface failure or link failure), the OSPF-TE must originate new TE-LSAs reflecting the connectivity and currently available resources. A TE-X must flush any corresponding RR TE-LSA from its TE-LSDB upon receiving a more recent TE-LSA from an OSPF-TE. Other peering TE-Xs perform the same action when they receive a copy of the more recent TE-LSA. This ensures that each TE-LSDB in the routing area is consistently up to date. If a path setup fails or returns an error condition, or if a path is torn down, the router requesting the explicit route from the TE-X, should send a "release" explicit route message, to enable the TE-X to originate new "RR" TE-LSAs to flush the older RRTE-LSA from the TE-LSDB of peer TE-Xs. If the resources allocated by routers during path setup are different from the resources requested in the path setup, OSPF-TE routers should also originate new TE-LSAs to reflect the change.

Loose Source Routing

A Label Switching Router (LSR) may obtain an explicit route from a TE-X if it is provided with a Loose Source Route in a path setup-signaling message.

Area Border Routers (ABRS)

Traffic engineering area border routers (TE-ABRs) send out network TE-LSA summaries. The definition of the network summary TE-LSA is beyond the scope of this invention. However, each TE-ABR in a routing area should be a TE-X in each routing area to which it is connected, to permit the ABR to exchange summary TE-LSAs with peer TE-Xs in other routing areas. This has the advantage of permitting a TE-X that is an ABR to provide information respecting paths across another area, and available resources associated with the paths. Otherwise, edge routers are not aware of resources available on routers in other areas. If it is not feasible to have every ABR function as a TE-X, an alternative is to have a domain router TE-X (DR TE-X) in a routing area summarize the network LSAs in that area and distribute the summary to all the ABRs in the routing area. The ABRs should distribute those summary TE-LSAs to the DR TE-X in other routing area(s) to which each ABR is connected. All ABRs in a routing area send network summary TE-LSAs received from other routing areas to the DR TE-X in their area. The DR TE-X in that area should in turn distribute the network summary TE-LSAs from other routing areas to all TE-Xs in the routing area.

TE-X List

Each OSPF-TE maintains a TE-X list for each routing area. An alternate option is to use OSPF Opaque LSAs to distribute router capability to scope the flooding of TE-X capability to a routing area, subnet or autonomous system (AS). A disadvantage is that extra OSPF Opaque LSAs need to be flooded. However, by setting a bit in the Options Field of the Router-LSAs to indicate the router capability, the number of control messages is not increased. It also possible to have different TE-Xs process different Resource Colors, but this is more involved, and more TE-X adjacencies are required. The concept can be expanded to allow different classes of constraints, for example, links for low delay traffic need only be sent to TE-Xs that serve low delay routes.

Figure 4:
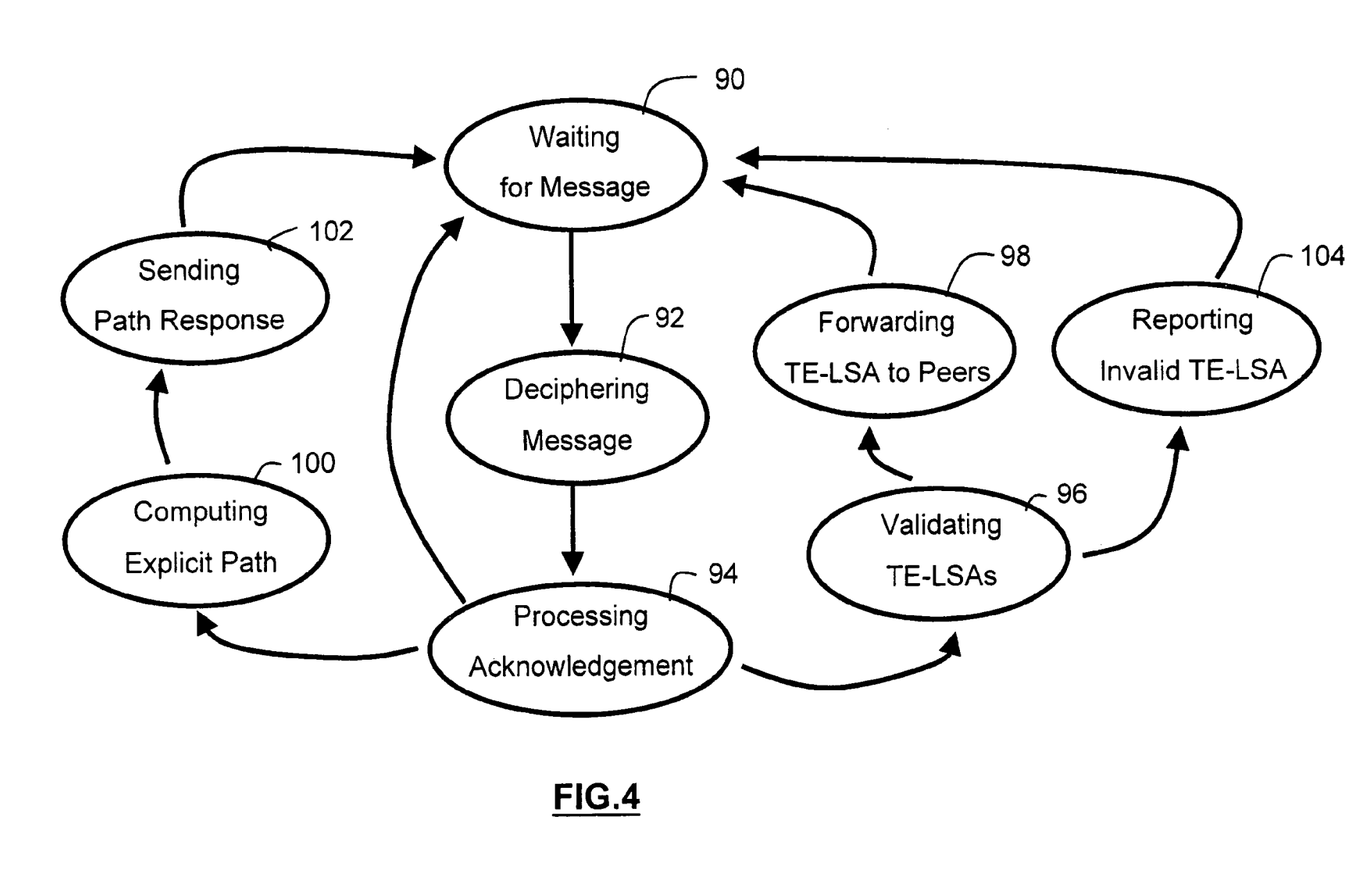
FIG. 4 is a state and diagram illustrating the states of the traffic engineering route exchange routers in accordance with the invention.

FIG. 4 is a state diagram that schematically illustrates the various states of a TE-X 42–46 in accordance with the invention. In a principal state 90, the TE-X 42 is waiting for a message. When a message is received, the message is deciphered in a message deciphering state 92. Different message types require different actions. Certain message types require only an acknowledgment. Acknowledgments are processed in state 94 and the TE-X returns to the state 90 to wait for messages, if the message processed in state 92 requires no further action. If the message is a TE-LSA, the TE-X analyzes the TE-LSA in state 96 to determine whether the TE-LSA is valid. If the TE-LSA is determined to be valid, the TE-X forwards in the TE-LSA to its peer TE-Xs. Otherwise, the TE-X enters state 104, in which it reports the invalid TE-LSA to a network management authority. The TE-X then returns to the waiting for message state 90.

The TE-X also receives requests for explicit paths from OSPF-TE routers, as explained above. If the message received is a request for an explicit path, the TE-X enters state 100 in which it computes an explicit path using its TE-LSDB, as explained above. The TE-X then enters state 102, in which it returns a path response message to the requesting OSPF-TE. The TE-X then returns to state 90 in which it waits for messages.

The embodiment(s) of the invention described above is(are) intended to be exemplary only. The scope of the invention is therefore intended to be limited solely by the scope of the appended claims.

I claim:

1. A method of establishing explicit constrained edge-to-edge paths in a one of an Internet Protocol (IP), MPLS and Optical network that uses a modified open shortest path first (OSPF) routing protocol for constraint route distribution and path computation, comprising steps of:

provisioning at least one OSPF router in the network that supports constraint path setup with traffic engineering route exchange router (TE-X) functionality to provide edge routers in the network with access to explicit constraint routes;

sending traffic engineering link state advertisement (TE-LSA) messages directly via unicast from the OSPF routers to only a nearest one of the at least one TE-X, without flooding the TE-LSAs to other routers in the network, to permit each of the at least one TE-X to maintain a traffic engineering link-state database (TE-LSDB) to compute constraint-based traffic engineering routes; and querying the nearest one of the at least one TE-X to obtain an explicit edge-to-edge path satisfying specified traffic engineering (TE) constraints.

2. The method as claimed in claim 1 wherein the step of querying is performed by a first edge router in the network.

3. The method as claimed in claim 1 further comprising a step of discovering the nearest one of the at least one TE-X via normal OSPF Router Link-State Advertisement messages.

4. The method as claimed in claim 3 further comprising a step of compiling and storing a list of all TE-Xs in a routing area and using the list to select a nearest TE-X based on a route cost factor associated with a shortest path route to respective TE-Xs in the list.

5. A method as claimed in claim 1 further comprising a step of discovering peer TE-Xs in the network by learning at each TE-X of other TE-Xs using normal OSPF Router Link-State Advertisement messages (Router LSAs), and storing a list of other TE-Xs discovered in the network.

6. A method as claimed in claim 5 further comprising a step of sending one of a Hello and Keep-Alive message directly via unicast to each other TE-X discovered in the network.

7. The method as claimed in claim 6 further comprising a step of sending tic engineering link states from each of the at least one TE-X to each other TE-X discovered in the network using a bi-directional communications connection set up with each other TE-X, in order to synchronize the TE-LSDBs.

8. The method as claimed in claim 1 wherein each of the at least one TE-X advertises its capability as a TE-X using a TE-bit in an Options field of Router Link-State Advertisement (Router LSA) messages.

9. The method as claimed in claim 1 further comprising a step of sending resources reserved (RR) TE-LSAs from the TE-X directly to peer TE-Xs in the network using a bi-directional communications connection set up with each peer TE-X to advise the peer TE-Xs of resources reserved when an explicit constrained path is established.

10. The method as claimed in claim 9 further comprising a step of sending a release explicit route message from an OSPF router that requested an explicit constrained path directly via unicast to the nearest TE-X, after the explicit constrained path is released, to permit the TE-X to flush RR TE LSAs related to the explicit constrained path that was released.

11. The method as claimed in claim 10 further comprising a step of sending resource reserved (RR) TE-LSAs from the TE-X to peer TE-Xs using a bi-directional communications connection set up with each peer TE-X in the network to permit the peer TE-Xs to flush the RR TE-LSAs related to the explicit constrained path that was released.

12. The method as claimed in claim 1 wherein the TE-LSAs include type, length, value (TLV) fields to define router addresses and link states.

13. The method as claimed in claim 12 wherein the TE-LSAs further include sub-TLV fields.

14. The method as claimed in claim 12 wherein the sub-TLV is a VPN sub-TLV used to indicate to other nodes in the network the VPN Identifier (VPN ID) that is associated with a router.

15. The method as claimed in claim 13 wherein the sub-TLV is a Replicating Capable sub-TLV used to indicate to other nodes that a router is capable of replicating data to more than one end point.

16. A traffic engineering route exchange router (TE-X) in a network that uses an open shortest path first (OSPF) routing protocol, comprising:
   a) a traffic engineering link-state data base (TE-LSDB) compiled using traffic engineering link-state advertisement (TE-LSA) messages received directly via unicast from OSPF routers in the network, each TE-X in the network receiving the TE-LSAs only from OSPF routers that have determined that the TE-X is a nearest one of the TE-Xs in the network and computing explicit edge-to-edge constraint-based routers through the network using the TE-LSDB;
   b) a messaging system for exchanging TE-LSA messages with peer TE-Xs in the network using a bi-directional communications connection set up with each peer TE-X; and
   c) a modified OSPF routing protocol for constraint route distribution and constraint path computation.

17. The TE-X as claimed in claim 16 wherein the TE-X is an area border router (ABR).

18. The TE-X as claimed in claim 17 wherein the ABR exchanges summary TE-LSAs with peer TE-Xs in other routing areas to provide information respecting paths across the other routing areas, and available resources associated with the paths.

19. The TE-X as claimed in claim 16 wherein on initialization the TE-X advertises its presence in the network using router link-state advertisement (Router LSA) messages.

20. The TE-X as claimed in claim 16 wherein a TE-bit is set in the Router LSA messages to advertise other routers in the network that the TE-X has traffic engineering route exchange capability.

21. The TE-X as claimed in claim 16 wherein the TE-X discovers peer TE-Xs in the network.

22. The TE-X as claimed in claim 21 wherein the TE-X discovers peer TE-Xs in the network by exchanging normal OSPF routing information with other routers in the network and creating adjacencies with neighbors in the network.

23. The TE-X as claimed in claim 22 wherein the TE-X further derives and stores a list of peer TE-Xs in the network using a downloaded domain link-state database.

24. The TE-X as claimed in claim 23 wherein the TE-X further sends one of Hello and Keep-Alive messages directly via unicast to the other TE-Xs in the list, in order to discover a designated TE-X and a backup designated TE-X in the network.

25. A TE-X as claimed in claim 24 wherein the TE-X exchanges TE-LSA messages with the designated TE-X after peering with the designated TE-X, to obtain all current TE-LSAs for the network, and stores the TE-LSAs in the TE-LSDB.

26. A TE-X as claimed in claim 25 wherein the TE-X flushes from the TE-LSDB obsolete TE-LSAs when more current TE-LSAs are received from an OSPF router in the network, which originated the TE-LSA.

27. A TE-X as claimed in claim 26 wherein the TE-X updates the TE-LSDB when the information respecting the explicit route is sent to the first OSPF edge router.

28. A TE-X as claimed in claim 16 wherein the TE-X:
   a) accepts queries from a first OSPF edge router for an explicit route between the first OSPF edge router and a second OSPF edge router in the network;
   b) computes the explicit route using information stored in the TE-LSDB; and
   c) sends information relating to the explicit route to the first OSPF edge router.

29. A method of reducing traffic engineering messaging loads in an OSPF network, comprising steps of:
   configuring at least one OSPF router that supports constraint path setup in the OSPF network as a traffic engineering route exchange router (TE-X) to provide edge routers in the network with access to explicit constraint routes;
   provisioning the at least one TE-X to advertise to other OSPF routers in the network—; and
   provisioning the other OSPF routers in the network to send traffic engineering link state advertisement (TE-LSA) messages directly via unicast to only a nearest one of the at least one TE-X, and to query only the nearest one of the at least one TE-X for an explicit constraint route to an edge router in the network to obtain an explicit edge-to-edge path satisfying specified traffic engineering constraints.

30. The method as claimed in claim 29 further comprising a step of enabling the at least one TE-X to build a traffic engineering link-state database (TE-LSDB) using the TE-LSA messages sent directly via unicast from the OSPE routers in the network, and further enabling the TE-X to use the TE-LSDB for computing the explicit route.

31. The method as claimed in claim 30 further comprising a step of enabling the at least one TE-X to send copies of the TE-LSA messages directly using a bi-directional communications connection set up with each peer TE-X in the OSPF network, and to receive TE LSA messages directly using a bi-directional communications connection set up with each peer TE-X in the OSPF network.

32. The method as claimed in claim 31 further comprising a step of enabling the at least one TE-X to flush outdated TE-LSAs from the TE-LSDB when a more current TE-LSA is received.

33. The method as claimed in claim 29 further comprising steps of:
enabling the other OSPF routers in the network to compile a list of the at least one TE-X in the network using network routing information; and
to select the nearest TE-X based on a least cost route of respective routes to respective ones of the at least one TE-X.

34. The method as claimed in claim 33 further comprising a step of enabling the other OSPF routers in the network to select a nearest TE-X by sending a probe message to the at least one TE-X in an order of least cost route until a one of the at least one TE-X acknowledges the probe message, thereby accepting to serve as nearest TE-X to the other OSPF router sending the probe message.

35. The method as claimed in claim 34 further comprising a step of enabling the other OSPF routers in the network to select a backup TE-X by sending a probe message to TE-Xs remaining after selecting the nearest TE-X in an order of least cost route until a one of the remaining TE-Xs acknowledges the probe message, thereby accepting to serve as backup TE-X to the other OSPF router sending the probe message.

36. The method as claimed in claim 29 further comprising a step of enabling the at least one TE-X to advertise to other OSPF routers in the network using a TE-bit in an Option field of an OSPF Router LSA message.

37. A data network that uses an open shortest path first (OSPF) routing protocol, comprising:
a) a plurality of OSPF routers, at least one of the OSPF routers that supports constraint path set up being provisioned to function as a traffic engineering route exchange router (TE X) to provide edge routers in the network with explicit constraint routes; and
b) a remainder of the routers being provisioned to send traffic engineering link-state advertisement (TE-LSA) messages directly via unicast to only a nearest one of the at least one TE-X, to enable the nearest TE-X to maintain a traffic engineering link-state database (TE-LSDB) for computing explicit constraint-based traffic engineering routes between edge routers in the data network.

38. A data network as claimed in claim 37 wherein the nearest TE-X is further adapted to send a copy of each TE-LSA received from the other OSPF routers in the data network directly using a bi-directional communications connection set up with each peer TE-X in the data network.

39. A data network as claimed in claim 38 wherein the other routers in the data network query the nearest one of the at least one TE-X to obtain an explicit route to another router in the data network.

40. A data network as claimed in claim 37 wherein the nearest TE-X is an area border router (ABR) in a routing area of the data network.

41. A data network as claimed in claim 40 wherein the ASBR peers with TE-Xs in other routing areas of the data network to which the ASBR is connected.

42. A data network as claimed in claim 37 wherein the nearest TE-X is an autonomous system border router (ASBR) in an autonomous system of the data network.

43. A data network as claimed in claim 42 wherein the ASBR peers with TE-Xs in other autonomous systems and other routing areas of the data network to which the ASBR is connected.

44. A data network as claimed in claim 37 wherein the data network is one of an Internet Protocol (IP), Multi-protocol Label Switched (MPLS), and Optical network.

* * * * *

UNITED STATES PATENT AND TRADEMARK OFFICE
CERTIFICATE OF CORRECTION

PATENT NO. : 6,985,959 B1  Page 1 of 1
APPLICATION NO. : 09/704291
DATED : January 10, 2006
INVENTOR(S) : Cheng Y. Lee It is certified that error appears in the above-identified patent and that said Letters Patent is hereby corrected as shown below:

Title page, Item [54] and Column 1, line 1,
Title, "CONSTRAINT ROUTE DISSEMINATION USING DISTRIBUTED ROUTE EXCHANGES" should read -- CONTRAINT ROUTE DISSEMINATION USING DISTRIBUTED ROUTE EXCHANGERS --;

Column 8,
Line 4, "all the OSPF-TES," should read -- all the OSPF-TEs, --;

Column 11,
Line 12, "Area Border Routers (ABRS)" should read -- Area Border Routers (ABRs) --;

Column 12,
Line 61, "step of sending tic engineering" should read -- step of sending traffic engineering --;

Column 13,
Line 27, "as claimed in claim 12" should read -- as claimed in claim 13 --; and Column 14,
Line 58, "from the OSPE" should read -- from the OSPF --.

Signed and Sealed this

Fourth Day of July, 2006

JON W. DUDAS
*Director of the United States Patent and Trademark Office*